No. 665,667. Patented Jan. 8, 1901.
L. B. ATKINSON.
ELECTRICAL MEASURING INSTRUMENT.
(Application filed June 8, 1900.)
(No Model.)
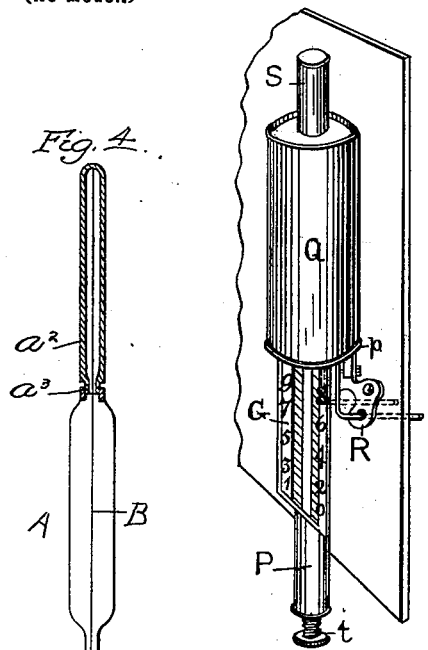
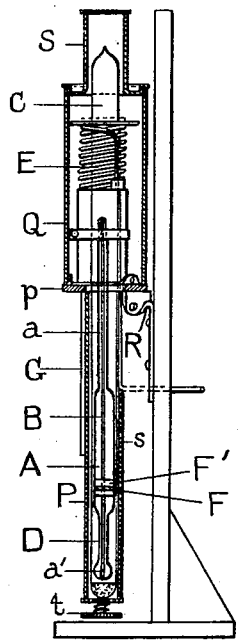
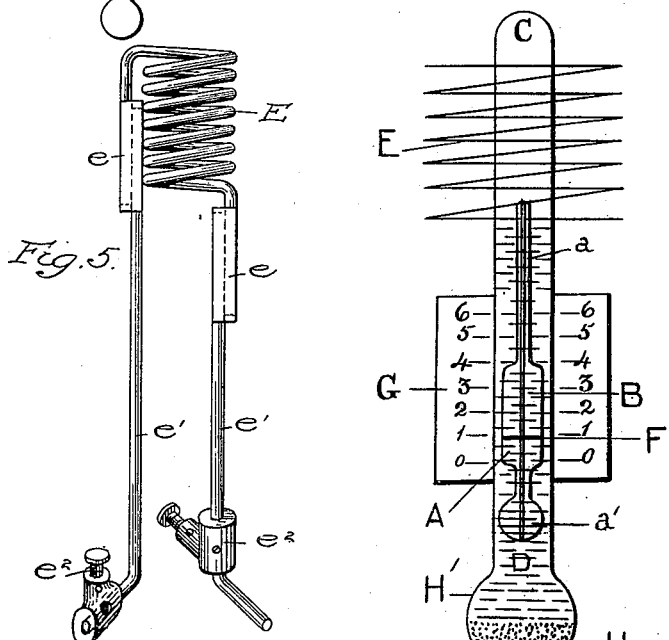
WITNESSES:
Ella L. Giles
Otto Munk
INVENTOR
Llewelyn Birchall Atkinson
BY
Richardson
ATTORNEYS
THE NORRIS PETERS CO., PHOTO-LITHO., WASHINGTON, D. C.

UNITED STATES PATENT OFFICE.

LLEWELYN BIRCHALL ATKINSON, OF CARDIFF, ENGLAND.

ELECTRICAL MEASURING INSTRUMENT.

SPECIFICATION forming part of Letters Patent No. 665,667, dated January 8, 1901.

Application filed June 8, 1900. Serial No. 19,600. (No model.)

*To all whom it may concern:*

Be it known that I, LLEWELYN BIRCHALL ATKINSON, a subject of the Queen of Great Britain and Ireland, and residing at Cardiff, in the county of Glamorgan, England, have invented a new and useful Improvement in Electrical Measuring Instruments, (for which I have made application for Letters Patent in Great Britain under No. 23,319, dated November 22, 1899,) of which the following is a specification.

This invention relates to electrical measuring instruments of a known principle for the measurement of electromotive force current and power in which a floating body in sensitive and static equilibrium in a liquid is attracted and moved by the electric current to be measured traversing a coil or coils surrounding the said floating body; and it consists of improvements whereby such an instrument may be cheaply made and put together, is portable without injury, and is adapted to be fixed to a vertical switchboard, automatic compensation being introduced for correction of readings caused by variation of external temperature.

The device is exceedingly sensitive and accurate and can be manufactured and produced at a trifling cost, either as an ammeter, a volt-meter for definite ranges, or as a maximum-current-recording instrument.

In order that my invention may be better understood, I now proceed to describe practical forms of carrying the same into effect, reference being had to the drawings hereto annexed and to the letters marked thereon.

Figure 1 is an external perspective view of my completed measuring instrument portable and adapted to be fixed in a vertical position. Fig. 2 is a vertical section showing mode of connecting coil to terminals, and Fig. $2^a$ is an enlarged transverse section of metal tube and scale attached thereto. Fig. 3 shows the containing-tube with arrangement to give compensation of readings at varying temperatures. Fig. 4 is a view showing the arrangement of the leads in connection with the coil. Fig. 5 is a detached view of the float adapted for a maximum indicator.

For the floating body of my device I use an ordinary hydrometer-bulb A, with a long stem $a$ and counterbalance $a'$ for stability when the bulb is used with the stem upright. Within this hydrometer-bulb is fitted a soft iron or steel or hardened-steel wire B, running axially nearly or entirely the whole length of the bulb. This bulb or float is placed in a glass tube C, closed at the bottom and at the top, containing a liquid D. About that part of the glass tube C that contains the stem of the float or into which the stem passes is placed a coil or coils of wire E, carrying the current to be measured. An index-line F is marked on the float A, either by engraving, by paint, or by an impressed line on a waterproof paper F' or in other convenient manner. A graduated and calibrated scale G is applied with a central slot in front of the tube C, upon which the indication of the index-mark F of the float A may be read.

To protect the glass tube, I place it as a loose fit pressed toward the index-opening by a spring $s$ inside an outer thin brass tube P, having a flange $p$, to which is attached the bracket R, suitable for screwing to a vertical switchboard. Upon the flange $p$ I mount a removable casing Q, surrounding the coil E, when the latter has been fixed and the leading-wires brought through the flange $p$ and the bracket R to facilitate the passing of the leads from the coil E through the bracket R. I connect the leads $e'$, Fig. 4, to the ends of the coil by clamps $e$, which permit the ends of the leads to swivel or turn in the said clamps. The binding-screws $E^2$ for the live wire may be fixed on the leads $e'$ at the front or back of the switchboard. I close the top of the casing Q by a flange-cap S, completing the closing in and the protection of the inner glass tube and coil.

To set the mark at zero, I close the bottom of the brass tube P with a cap and a set-screw $t$, upon which the glass tube rests. By adjusting the set-screw $t$ up or down the glass tube and the floating hydrometer therein, with its mark, can be set to zero when no current is passing.

The float A when no current is passing remains in sensitive but static equilibrium of flotation, with its index-mark F at zero on the scale G. When the current passes through the coil E, the attraction of the solenoid so formed attracts the soft-iron or steel magnet-wire B of the float A, and thus disturbs the normal equilibrium of flotation, and the amount of such disturbance and movement may be read by the index F upon the scale G, which is a celluloid face upon a thin sheet-metal frame, secured in the slot of the tube P by bent clips, Fig. 2ª, thus bringing the scale as nearly tangential as possible to the face of the glass tube C.

The scale afforded by such an instrument may be made in an ammeter nearly proportioned to the current or in a voltmeter, where it is necessary or desirable to only measure a short part of the whole range. This may be effected by either putting the end of the magnetic wire at such a distance from the end of the coil that the current reaches a determined limit before the movement commences or by so weighting the float that it rests upon the bottom of the containing-tube and only lifts when the current reaches the determined limit. Since the point of equilibrium at which the float will rest depends on the density of the liquid and is therefore affected by the temperature of the liquid, involving normally a change of zero with a change of temperature, I provide the following means for obviating this difficulty: I fill the tube, as in Fig. 3, with a solution of a salt much more soluble in hot than in cold water, such as ammonium sulfate or ammonium chlorid, with which the solution is saturated and of which a residue of undissolved salt H remains in contact with the water at the bottom of the tube. By this means the density of the liquid of flotation may be kept constant through all climatic variations of temperature, and I provide an extension of the tube in the form of a bulb H', or it may be a separate vessel connected with the tube containing such a bulk of liquid that the liquid in the bulb or vessel in expanding raises the surface of the liquid in the tube by the amount which the hydrometer falls, due to the variation in density of the liquid.

Though I have described the float as conveniently of glass, it is to be understood that metal or other materials may be substituted, and though I have found water, if pure and in a clean glass vessel, to be a very suitable liquid other liquids—such as ether, chloroform, carbon disulfid, tar, oils, and the like—may be used either alone or in combination with water or with one another.

To adapt my device as a maximum-current recorder, I adapt a special stem $a^2$, Fig. 5, of unglazed earthenware or similar porous material to the float A, so that the maximum upward movement of the float in its supporting liquid may be indicated by a mark or stain on the stem by means of an upper and lighter staining liquid where two liquids are used. The stem $a^2$ as the current increases enters more and more into a distinct staining or marking liquid. Liquids suitable for this purpose are carbon disulfid for the lower liquid and water with a few drops of anilin dye for the upper liquid. In this case the stem $a^2$ should be removable from the float or bulb A, making a joint with the neck of the bulb by a collar of cork or india-rubber $a^3$.

Having now described this invention, what I claim, and desire to secure by Letters Patent, is—

1. An electrical-current-measuring device, consisting of, in combination, a hydrometer-float in a transparent tube, adapted to indicate by its point of flotation the current passing in a surrounding coil; a metal tube protecting such transparent tube, having a slot and a scale attached for reading the height of flotation of the hydrometer; an adjusting set-screw in the bottom of said metal tube; a flange on said metal tube attached to a bracket adapted to be secured to a vertical board; a metal shell on said bracket surrounding the current-coil; swivel connections from ends of coil to terminals; a cap fitted in the top of said shell to cover and protect the top of the coil and the top of the inner glass tube; and means for compensation of readings for variable temperature.

2. In combination, a hydrometer-float in a transparent tube, adapted to indicate the current passing in a surrounding coil; a conducting-coil surrounding upper part of said tube; metallic coverings to said tube and coil; and right-angled bent connections from ends of coils; clamps attaching said connections to ends of coils; adapted to permit rotation of said connections in said clamps, the bent ends of said connections passing through the supporting-bracket, carrying terminal screws in front or behind the switchboard.

3. In an electrical-current-measuring device, consisting of a floating body operated by the magnetic attraction of the passing current, means for inclosing said floating body, adapted for attachment to a switchboard; and means for maintaining the constant density under varying temperature of the supporting liquid, consisting of a saturated solution of a salt more soluble in hot than cold water, with a further supply of said salt, such as ammonium sulfate or chlorid, in contact with said solution, and a connected chamber of larger volume than the other part of containing-tube.

In witness whereof I have hereunto set my hand in presence of two witnesses.

LLEWELYN BIRCHALL ATKINSON.

Witnesses:
RICHARD A. HOFFMANN,
CHARLES CARTER.